Dec. 20, 1932.   D. F. NEWMAN   1,891,439
PROJECTION SYSTEM
Filed Dec. 10, 1928
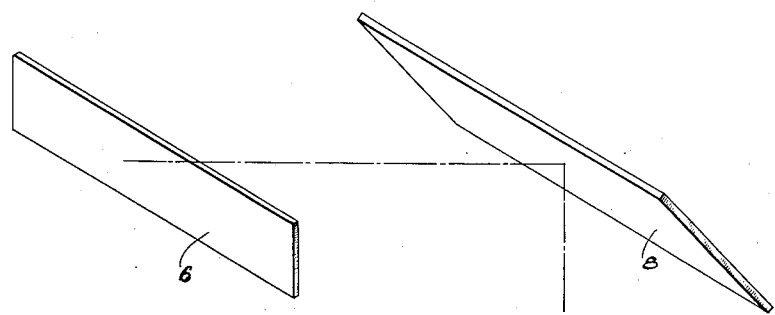
*Fig. 1*
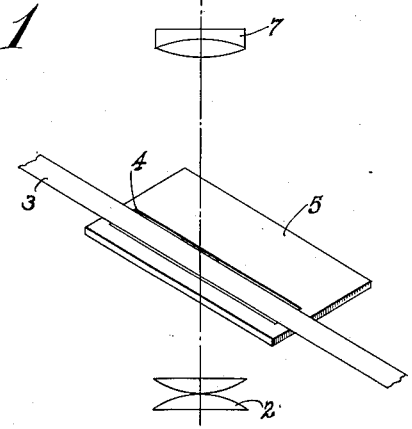
*Fig. 2*
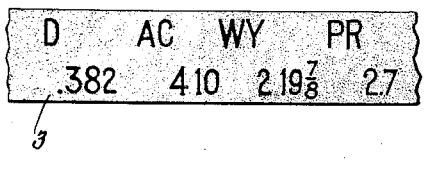
INVENTOR
David F. Newman
BY
Ward & Crosby
ATTORNEYS Patented Dec. 20, 1932

1,891,439

UNITED STATES PATENT OFFICE

DAVID F. NEWMAN, OF FREEPORT, NEW YORK, ASSIGNOR TO TRANS-LUX DAYLIGHT PICTURE SCREEN CORPORATION, OF NEW YORK, N. Y., A CORPORATION OF DELAWARE

PROJECTION SYSTEM

Application filed December 10, 1928. Serial No. 324,873.

This invention relates to a projection system.

In accordance with the invention, the light-diffusing character of a tape, film or the like is related to the degree of transparency of a screen in a manner whereby satisfactory image definition is obtained on said screen.

In such a system, the images ordinarily will not be clearly legible and will not stand out clearly on the screen if the tape and screen are formed of transparent material without modification. I have found, however, that said images will stand out clearly on the screen, and they will be clearly legible, if the tape is treated or arranged to be somewhat diffusive of light, as, for example, by having at least one surface roughened uniformly, while the screen used in the system for rear projection may be substantially transparent, or more nearly transparent than would otherwise be necessary.

According to another phase of my invention, I have also found it desirable to color the tape a suitable color to filter out or eliminate or compensate for undesired or harsh colors or components of the light emitted by the projecting lamp. Thus, the tape may be colored blue or green when the projecting lamp gives a light which is predominantly yellow.

Further objects, features and advantages of the invention will more clearly appear from the detailed description given below taken in connection with the accompanying drawing which forms a part of this specification.

In the drawing, Fig. 1 illustrates diagrammatically a system for projecting the images of printed matter on ticker tape onto and through a translucent screen.

Fig. 2 represents a plan view of a section of ticker tape which can be employed in the system indicated in Fig. 1 and which comprises a part of the invention.

Referring to the drawing, a suitable projecting light source is indicated at 1, which may be any suitable source and is indicated as an incandescent lamp bulb. The light from this source may be projected through a suitable lens system as indicated at 2, and thence through moving ticker tape 3, which passes over a suitable opening or window 4 in a support 5. The light passing through the tape 3 is projected by suitable optical means, preferably upon the rear surface of a suitable translucent screen 6, through which the projected light passes, the images of the printed matter carried by tape 3 appearing on the front side of the screen where they may be viewed by numerous persons. As indicated, the light passing through the tape may be concentrated by a lens or lens system 7, and thereafter deflected by a mirror 8 upon the surface of screen 6, the optical means illustrated being of course merely diagrammatic and by way of example.

The tape 3 may be moved across the opening in support 5 in any suitable manner as well understood in the art.

The screen 6 may comprise a translucent or substantially transparent screen of suitable material such, for example, as a screen formed as a thin sheet of rubber which may be rolled and cured in the usual manner. The screen should of course be properly mounted and positioned for the viewing by the audience of the images shown thereon.

The tape 3 may be a continuous tape such as used in connection with the usual stock ticker or news ticker machine or the like, the ticker printing stock quotations or the like upon the tape as it passes therethrough. The tape is formed of suitable substantially transparent material such as one of the various known materials having a gelatinous or a cellulose base, or other known substantially transparent or translucent materials. This material in accordance with the present invention is treated or modified in a manner to make it diffusive of the light passing therethrough. Preferably this is accomplished by roughening one or both surfaces of the tape uniformly to a slight extent, as for example by an impression roller. This can be accomplished, for example, by having one of the calendering rolls, used in the production of the tape, covered with a fabric, the impression of which will slightly and uniformly roughen the surface of the tape. Or the roughening of the surface may be provided by an etching action, sanding action, or by other suitable means such as painting or spraying. I note that thus roughening the surface or surfaces of the tape not only gives the tape the desired diffusive effect but also that it enables the tape to take the ink somewhat better in the printing operation in the ticker, thus rendering better definition to the printed characters.

The tape is also, in accordance with one phase of the invention, colored or tinted with a color suitable to filter out, compensate for, or eliminate undesired or harsh colors or light components in the light emitted by the projecting lamp. Thus preferably when the lamp 1 gives a light in which the yellow rays are prominent, the color or tint employed for the tape may be one on the blue side of the spectrum, such as a suitable blue or green as will be well understood. The color may be applied to the tape in any usual and suitable way as by means of a suitable dye or pigment.

I have found that when the tape is rendered diffusive as by roughening the surface or surfaces thereof in the manner indicated, that the images of the printed matter on the tape stand out clearly and are readily legible on the face of the screen 6 which would not be the effect if transparent tape were used unmodified, and the images thrown on a translucent screen. Likewise the coloring of the tape to eliminate or compensate for undesired or harsh color elements in the projecting light provides an improved and more restful effect upon the eyes of the persons viewing the projected images.

According to one phase of the invention, the desired diffusive effect may be embodied in the tape by mixing any suitable diffusing agent, such as casein, magnesium, carbonate, zinc oxide, or the like, with the gelatinous, the cellulosic, or other material of which the tape is made. A diffusive effect of the desired uniformity and degree of translucence is thus assured. It has been found that the proper degree of diffusion can be secured by effecting only incomplete elimination of the impurities found in some grades of gelatine.

An important aspect of my invention relates to the association of a representation-bearing tape which is rendered suitably light-diffusive, for example, as hereinbefore described, or which is light-diffusive to somewhat the same extent as the hereinbefore described treated tapes, with a screen, the transparency of which has been fixed or determined in view of the degree to which said tape is light-diffusive. There are many advantages apparent to those skilled in the art which flow from such an arrangement, a particularly important advantage residing in the satisfactory type of image definition which may be obtained on a large screen.

My invention has been hereinbefore specifically described in connection with its application to ticker tape or the like which as commercially used is single-layer material, the thickness of which is relatively slight.

While I have described my invention in detail and with respect to certain embodiment thereof, I do not desire to be limited to such details or forms, since many changes and modifications may be made and the invention may be embodied in other forms without departing from the spirit and scope of the invention in its broader aspects. Hence I desire to cover all modifications and forms coming within the language or scope of the appended claim.

What I claim as new and desire to secure by Letters Patent is:

The combination with a light transmission ticker tape having a light diffusing characteristic which has been increased beyond that imparted thereto by the normal tape constituents, a source of light, a screen the transparency of which has been increased in view of the increased light diffusing characteristic of the tape, and means for projecting light from said source through the tape, whereby satisfactory character definition is obtained on the screen from characters on the tape.

In testimony whereof I have signed my name to this specification.

DAVID F. NEWMAN.